United States Patent
Goin (12)

(10) Patent No.: US 6,481,792 B1
(45) Date of Patent: Nov. 19, 2002

(54) SEAT CUSHION SYSTEM FOR MOTORCYCLES

(76) Inventor: Bobby G. Goin, 1752 Old Niles Ferry Rd., Maryville, TN (US) 37803

( * ) Notice: Subject to any disclaimer, the term of this patent is extended or adjusted under 35 U.S.C. 154(b) by 3 days.

(21) Appl. No.: 09/616,242

(22) Filed: Jul. 14, 2000

(51) Int. Cl.⁷ .................................................. B60N 2/38
(52) U.S. Cl. ............................ 297/195.13; 297/219.11
(58) Field of Search ......................... 297/195.1, 195.13, 297/201, 219.1, 219.11, 228.13, 243, 440.1

(56) References Cited

U.S. PATENT DOCUMENTS

| | | |
|---|---|---|
| 3,712,670 A | 1/1973 | Svehla et al. |
| 4,779,924 A | 10/1988 | Rudel |
| 4,804,221 A | 2/1989 | Saiki |
| 5,318,344 A * | 6/1994 | Wang ........................ 297/199 |
| 5,322,345 A | 6/1994 | Desser et al. |
| 5,553,915 A | 9/1996 | Stamatakis |
| 5,558,260 A | 9/1996 | Reichert |
| 5,697,671 A | 12/1997 | Shavitz |
| 5,713,629 A | 2/1998 | Plackis |
| 5,938,277 A * | 8/1999 | Rioux et al. ............. 297/195.1 |
| 5,944,380 A * | 8/1999 | Atherley ..................... 180/219 |
| 5,975,629 A | 11/1999 | Lorbiecki |

OTHER PUBLICATIONS

1995 Harley Davidson Parts & Accessories Catalog pp. 32,42,43 & 48 (copies not included—cited as prior art in '671 patent).

Hot Bike Magazine, Dec. 1995; 3 Advertisements (1) "Ultraride" (2) Phantom Pad (3) King Seat for Royal Pains in the Butt (copies not included—cited as prior art in '671 patent).

* cited by examiner

Primary Examiner—Peter R. Brown
(74) Attorney, Agent, or Firm—Luedeka, Neely & Graham, P.C.

(57) ABSTRACT

According to the present invention, there is provided a novel auxiliary passenger seat cushion system adaptable to fit onto a passenger seat of a motorcycle. The auxiliary passenger seat cushion is used with a motorcycle seat having a width defined between opposite sides thereof. The passenger seat cushion system has a seat member having an upper surface configured for seating a passenger and an opposite lower surface positionable adjacent to the motorcycle seat and having a width greater than that of the motorcycle seat. The passenger seat cushion system also includes at least two stop members associated with the lower surface of the seat member and adjustably positionable relative to the width of the lower surface of the seat member so that one stop member is urgable against each of the opposite sides of the motorcycle seat. In another embodiment of the invention, the seat cushion member is composed of a number of separable sections for breakdown and storage into an auxiliary storage compartment. A fastener is included for fixedly securing the separable sections together to provide a composite cushion member. Furthermore, adjustable stop members are used to engage an existing motorcycle seat by urging against the opposite sides of the motorcycle seat. The adjustable stop members are adjustable enabling the auxiliary passenger seat cushion to engage motorcycle seats of varying dimensionality.

16 Claims, 6 Drawing Sheets

SEAT CUSHION SYSTEM FOR MOTORCYCLES

TECHNICAL FIELD

This invention relates generally to motorcycle seat cushions. More particularly, this invention relates to an auxiliary passenger seat cushion adaptable to a variety of motorcycles.

BACKGROUND OF THE INVENTION

The sport of motorcycling has grown to epic proportions, and is continuing to grow in popularity. Almost all motorcycles designed for street use include rear seating to accommodate a passenger. It is very common for a passenger to be "doubled" with the motorcycle operator during the riding time. Production motorcycles designed to accommodate the passenger with seating even similarly comfortable as that of the operator are typically large "dressed" motorcycles, commonly referred to as the "cruisers."

Many of the other so called "Big Bikes" do not have a comfortable passenger seat, these "Big Bikes" collectively outnumber the "cruisers" by a large margin. These are commonly referred to as "Customs." Many "Customs" are factory designed, and many are owner-modified or hand-built. The "Customs" category of motorcycles typically have an undersized and uncomfortable passenger seat. The typical passenger seat on a "Custom" is 5 to 7 inches wide, compared to an average 12 to 14 inches wide seat for the operator. The small passenger seats are commonly referred to as "Pillion pads." The use of such small pillion pads results mainly from aesthetic criterion.

The typical motorcycle ride lasts for several hours, and very often several days, covering hundreds of miles. The pillion pad is uncomfortable and the passenger is subjected to discomfort and fatigue. Currently, small pillows and cushions are placed on the pillion pad in an effort to improve comfort and ridability. In general, they do not work well.

Thus, there is a need for a device suitable for improving passenger comfort but which may be quickly removed when not in use for aesthetic purposes.

SUMMARY OF THE INVENTION

The foregoing and other needs are met by a novel auxiliary passenger seat cushion system adaptable to fit onto a passenger seat of a motorcycle. The auxiliary passenger seat cushion is intended to be used with a motorcycle seat having a width defined between opposite sides thereof. The seat cushion system has a seat member having an upper surface configured for seating a passenger and an opposite lower surface positionable adjacent to the motorcycle seat and having a width greater than that of the motorcycle seat. The seat cushion system also includes at least two stop members associated with the lower surface of the seat member and adjustably positionable relative to the width of the lower surface of the seat member so that one stop member is urgable against each of the opposite sides of the motorcycle seat to inhibit relative movement between the seat cushion member and the motorcycle seat.

In another embodiment of the present invention, the seat cushion member is composed of a number of separable sections for breakdown and storage into an auxiliary storage compartment. A fastener is included for fixedly securing the separable sections together to provide a composite cushion member. Furthermore, adjustable stop members are used to engage an existing motorcycle seat by urging against the opposite sides of the motorcycle seat thereby restricting relative motion between the passenger cushion seat and motorcycle seat. The adjustable stop members are adjustable enabling the auxiliary passenger seat cushion to adaptably engage motorcycle seats of varying dimensionality.

BRIEF DESCRIPTION OF THE DRAWINGS

Further advantages of the invention will become apparent by reference to the detailed description when considered in conjunction with the figures, wherein like reference numbers indicate like elements through the several views, and wherein.

DETAILED DESCRIPTION OF THE INVENTION

Figure 1:
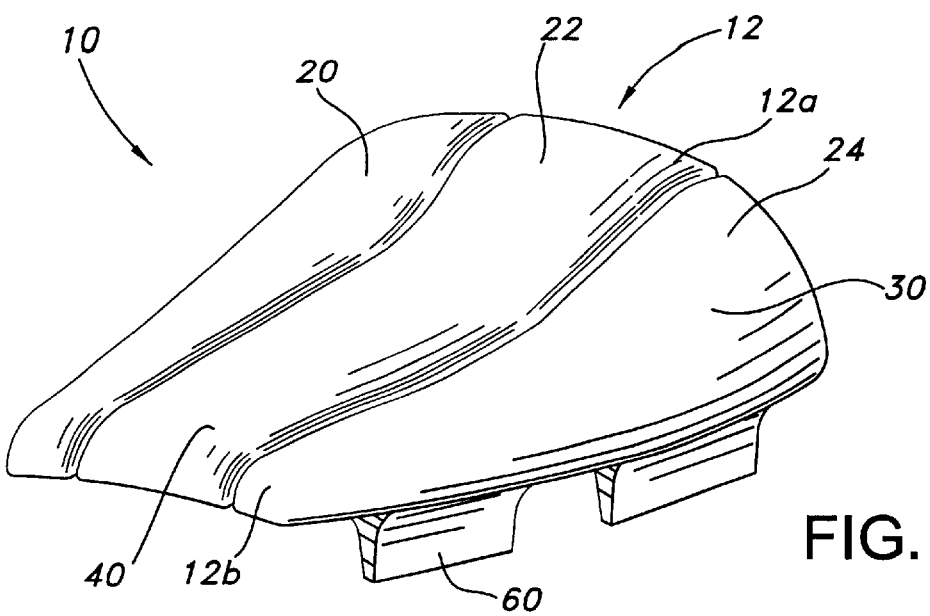
FIG. 1 a front perspective view of a seat member for use in a seat cushion system in accordance with the invention.
Figure 2:
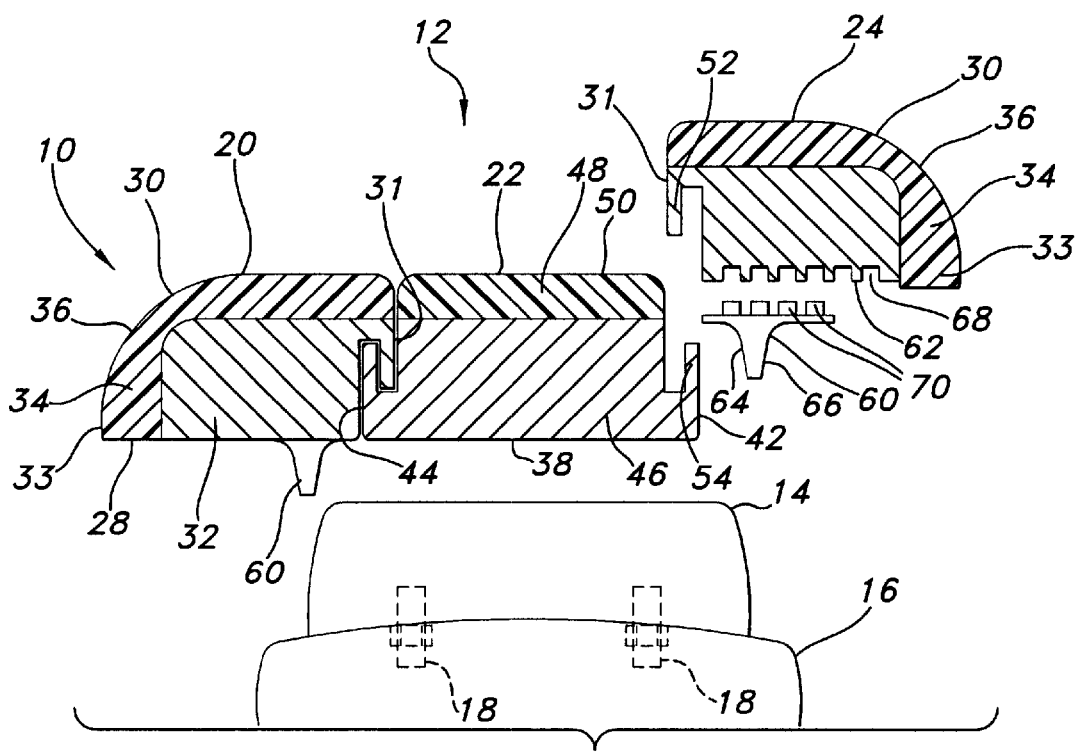
FIG. 2 is a cross-sectional front end view of a seat cushion system in accordance with the invention.

With initial reference to FIGS. 1 and 2, the invention relates to a seat cushion system 10 for use with a motorcycle of the type having a pillion pad as a passenger seat. The seat cushion system 10 includes a seat member 12 that is positionable onto a motorcycle seat or pillion pad 14 of a type generally affixed to a motorcycle frame 16 as by fasteners 18. The motorcycle seat 14 shown herein is of a type designed for a passenger other than the driver of the motorcycle who rides behind the driver. Preferably the seat cushion 10 has a length of between about 9 inches and about 12 inches, a height of between about 1 inch and 4 inches, and the width is between about 9 inches and about 16 inches.

Figure 9:
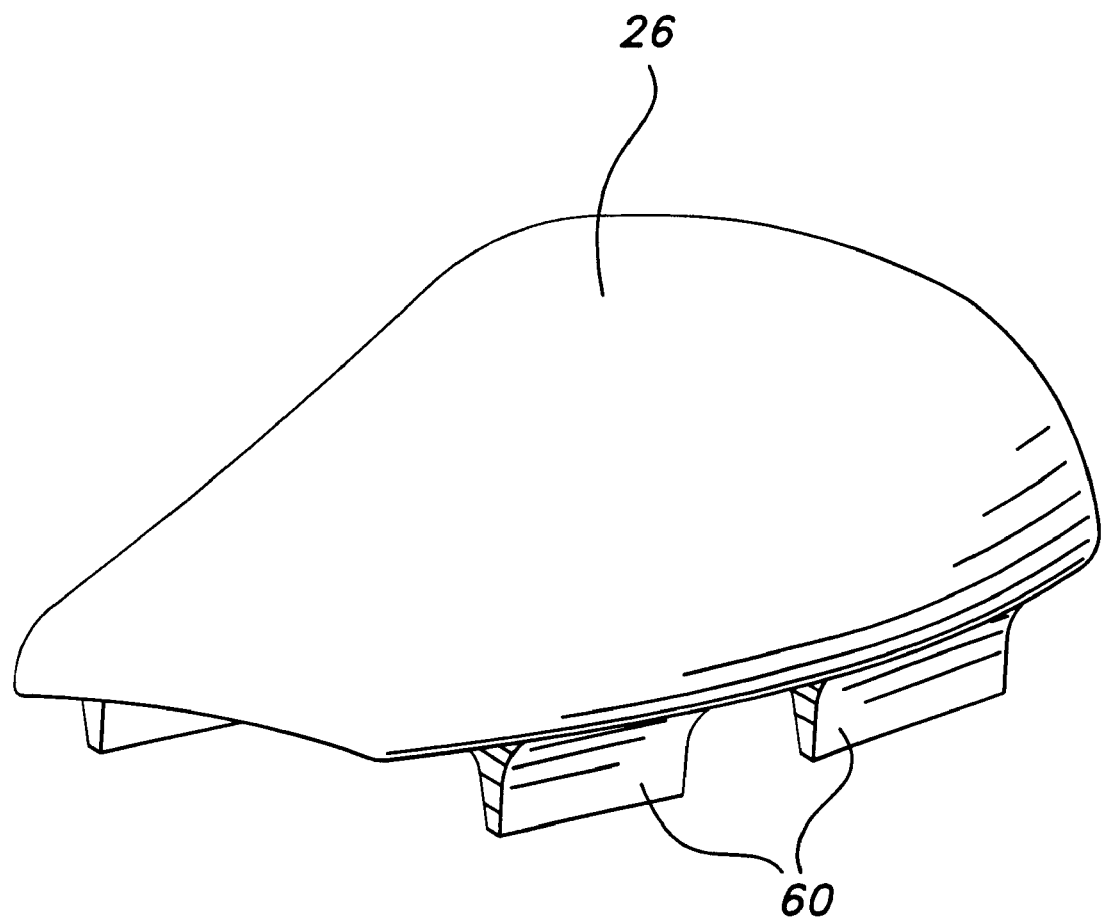
FIG. 9 is a front perspective view of another embodiment of a seat member for use in a seat cushion system in accordance with the invention.

The seat member 12 preferably includes at least two separable seat portions or members which may be stored away when the seat cushion system 10 is not being used. Preferably, the seat member 12 includes a first outer seat member 20, an inner seat member 22, and a second outer seat member 24 interconnectable with one another to provide the seat member 12. Alternatively, the seat member 12 could be provided by a single seat member 26 (FIG. 9). The use of a plurality of interconnectable seat members, such as the members 20–24, is advantageous to enable the seat cushion system 10 to be quickly separable and compactable for ease of storage and portability when not in use. Accordingly, seat cushion system 10 may be stowed into a saddlebag or a separate carrier may be attached to the motorcycle for storage of seat cushion system 10.

Preferably, seat members 20 and 24 are preferably identical mirror-images of one another and, accordingly, the description below refers to both seat members 20 and 24, respectively.

Seat member 20 includes a substantially flat or planar bottom surface 28 and a contoured top surface 30 which has a generally contoured shape so that when seat members 20, 22, and 24 are combined together, the resulting seat member 12 has a contoured shape typical of seats used to provide additional comfort to a passenger. Seat member 20 also has an inwardly facing surface 31 and an opposing contoured surface 33. As shown in FIG. 2, which is not to scale, seat member 20 includes a base member 32, a fill or padding material 34 and a cover 36. Alternatively, seat member 20 could be composed of just one material such as a soft plastic material, rubber or some other semi-rigid material. Preferably, base member 32 is formed of wood, hard plastic or a lightweight metallic alloy. Fill material 34 is preferably any type of soft material which maintains its elasticity, such as foam. Alternatively, air or fluid could be utilized as another form of fill material 34. Cover 36 is preferably a durable material such as leather, plastic, vinyl or the like.

Seat member 22 also includes a substantially flat or planar bottom surface 38. When seat members 20–24 are releasably engaged to one another, the flat bottom surfaces 28 and 38 are aligned in a substantially planar configuration providing a stable base to the seat cushion system I0. Additionally, the flat bottom surfaces 28 and 38 provide a large surface area tending to maintain the seat cushion system 10 on the motorcycle seat 14. The bottom surfaces 28 and 38 may be coated with a gripping or traction agent such as textural rubber or plastic film or foam material which provides additional traction characteristics maintaining the seat cushion system 10 on the motorcycle seat 14.

Seat member 22 also includes a contoured top surface 40, for the same reasons as described above for seat member 20. The contoured top surfaces 30 and 40 of seat members 20–24 generally slope from a high portion at the rear 12a of the seat member 12 to a lower portion toward the front 12b of the seat member 12. Alternatively, the seat member 12 may have a saddle-like shape wherein the front 12b and rear 12a portions are both elevated with respect to the interior of seat member 12. The higher portions of seat member 12 tend to prevent a passenger from sliding off of the seat cushion system 10 when the motorcycle is accelerated or decelerated abruptly. Seat member 22 further includes two outwardly facing opposing surfaces, first side 42 and second side 44, a base member 46, fill material 48 and a cover 50. Base member 46, fill material 48 and the cover 50 of seat member 22 are preferably composed of similar materials as those described above for seat member 20.

Figure 3:
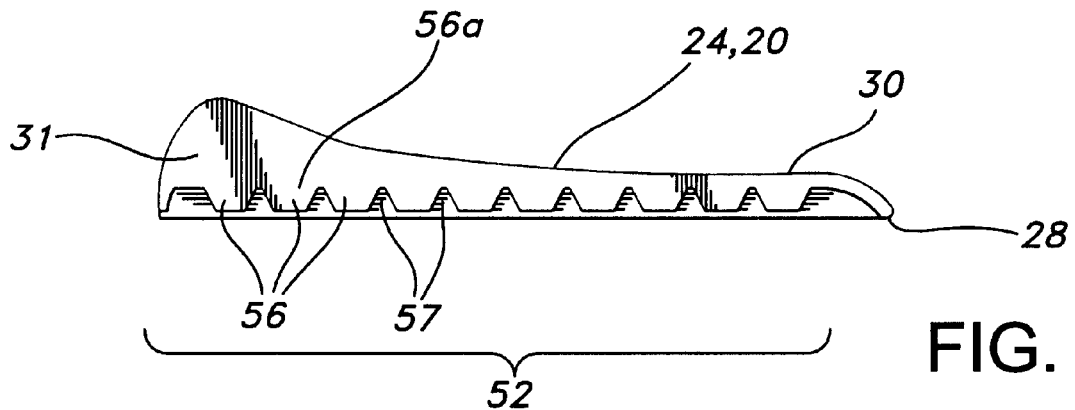
FIG. 3 is a cross-sectional side view of a component of the seat member of FIG. 1.
Figure 4:
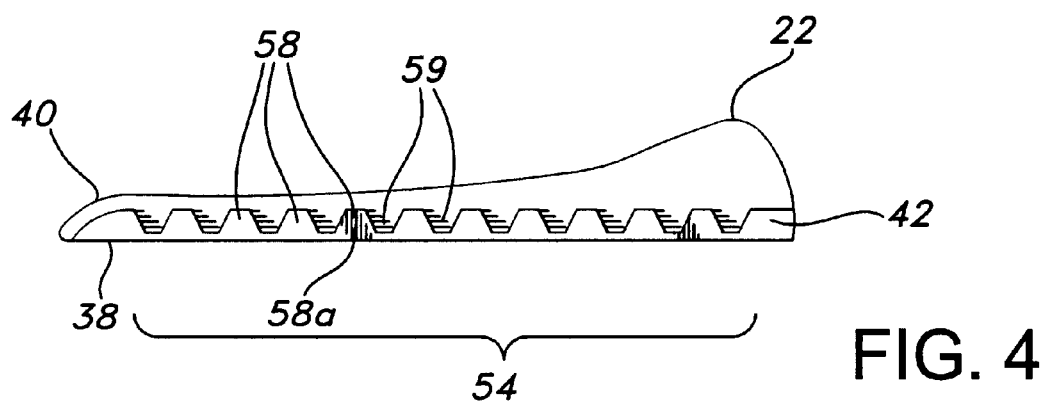
FIG. 4 a cross-sectional side view of another component of the seat member of FIG. 1.

Referring to FIGS. 2–4, seat members 20, 22 and 24 are secured together to form the seat member 12 by utilizing a fastening mechanism 52 located on the inwardly facing surfaces 31 of seat members 20 and 24, and a corresponding fastening mechanism 54 located on the outwardly facing surfaces 42 and 44 of seat member 22. Preferably, the fastening mechanism 54 is configured for receiving the fastening mechanism 52 by pushing first and second outer members 20 and 24 down onto the inner seat member 22. As shown in FIG. 2, first outer seat member 20 is shown secured to the inner seat member 22, while second outer seat member 24 is separate from the inner seat member 22. The seat member 12 is formed into the composite seat member 12 by combining the second outer seat member 24 with the inner seat member 22 by downwardly engaging fastening mechanism 52 with fastening mechanism 54.

Figure 2A:
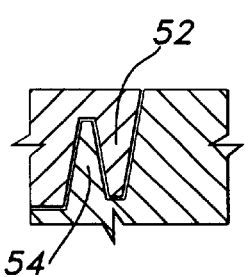
FIG. 2a is a cross-sectional view of another embodiment of a component of the seat member of FIG. 1.

When the seat cushion system 10 is placed on the motorcycle seat 14 and a passenger sits on the seat cushion system 10, two things occur to enhance the stability of the seat cushion system 10. First, the passenger provides a downward force to the first and second outer seat members 20 and 24, respectively. Second, there is a reactionary force from the motorcycle seat towards the bottom surface of the seat cushion system 10. These two forces combine to securely interlock fastening mechanisms 52 and 54. It is important that the fastening mechanism 52 and 54 be strong and secure when engaged to ensure rider safety, while also allowing ready detachability of the seat members 20–24 for quick and easy storage of the seat cushion system 10 when not in use. Fastening mechanisms 52 and 54 may be formed as part of the seat members 20–24 or attached separately as added on components to the seat members 20–24. Furthermore, fastening mechanisms 52 and 54 may preferably be formed with a wedge-like cross-section, as shown in FIG. 2a, which tends to further the interlocking function of the fastening mechanisms 52 and 54 when a downward force is applied to the first and second outer seat members 20 and 24, respectively, resulting in a stable seat member 12.

A preferred embodiment of the fastening mechanisms 52 and 54 is shown in FIGS. 3 and 4. Preferably, fastening mechanisms 52 and 54 are each formed of a plurality of fingers or teeth 56 and 58, respectively. A plurality of gaps 57 and 59 are located between the teeth 56 and 58 for receiving the teeth 56 and 58 in a complimentary interlocking arrangement. The teeth 56 of the outer seat member 20 are formed to interlock or mesh with the opposing teeth 58 located on the outwardly facing surfaces 42 and 44 of seat member 22 (FIG. 4a).

Figure 4A:
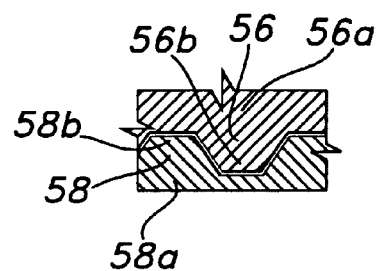
FIG. 4a is a cross-sectional side view of a component of the seat member of FIG. 4.

Preferably the teeth 56 and 58 have a base 56a and 58a and a distal portion 56b and 58b (FIG. 4a). The teeth 56 of fastening mechanism 52 are oriented on the inward surface 31 of outer seat member 20 so that the base 56a is located adjacent to the top surface 30 and the distal portion 56b is located adjacent to the bottom surface 28 (FIG. 3). Correspondingly, the teeth 58 of fastening mechanism 54 are oriented on the outwardly facing surfaces 42 and 44 of inner seat member 22 so that the base 58a is located adjacent to the bottom surface 38 and the distal portion 58b is located adjacent to the top surface 40 (FIG. 4).

As shown in FIG. 4a it is preferred that the teeth 56 or 58 taper from the wider base 56a or 58a to the narrower distal portion 56b or 58b. It is also preferable for the gaps 57 and 59 have similar geometrical configurations for releasably engaging the teeth 56 and 58. In this fashion, when the three seat members 20–24 are press-fit together to form seat member 12, the interlocking teeth 56 and 58 mesh together to provide a rigid and stable connection between seat members 20–24.

The teeth 58 of fastening mechanism 54 are preferably formed in an upright configuration (FIG. 4) as compared to the downward configuration of teeth 56 of seat member 20 (FIG. 3). The teeth 56 and 58 are oriented in this manner to utilize the resultant torque force generated by the weight of a passenger onto seat members 20 and 24 and particularly to the fastening mechanism 52 and 54. Depending on the width of the motorcycle seat 14, the torque force may be somewhat alleviated by the interaction of the lower surface 28 of seat members 20 and 24, and the motorcycle seat 14. Furthermore, when the seat member 12 is placed on top of motorcycle seat 14, an upward force exerted by the motorcycle seat 14 to the seat member 22 coupled with the downward force exerted by a passenger onto seat members 20 and 24 furthers the interlocking function of the teeth 56 and 58. The engaged interlocking teeth 56 and 58 further warrant that seat member 12 will remain together during periods of acceleration and deceleration of the motorcycle.

Figure 5:
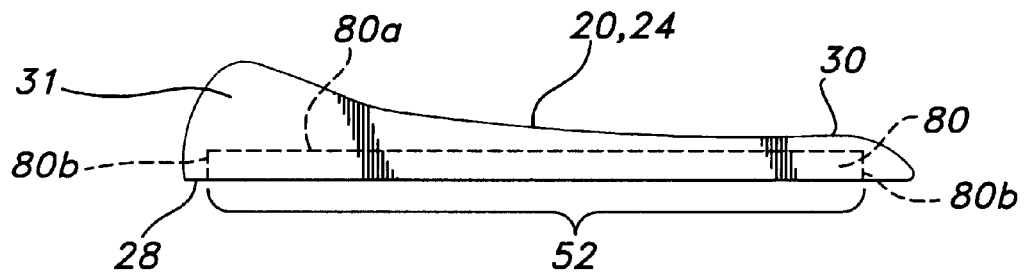
FIG. 5 is a cross-sectional side view of another embodiment of a component of the seat member of FIG. 1.
Figure 6:
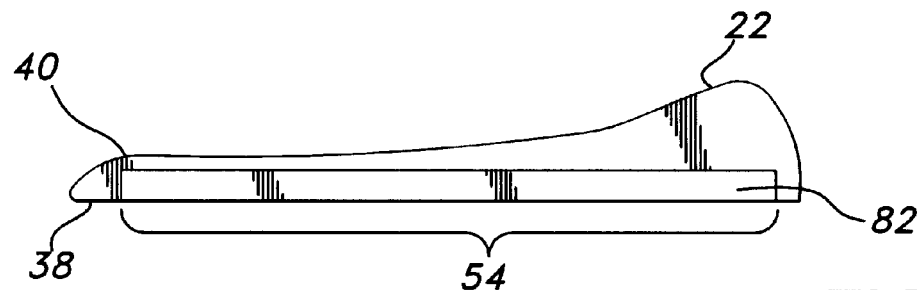
FIG. 6 a cross-sectional side view of another embodiment of a component of the seat member of FIG. 1.
Figure 6A:
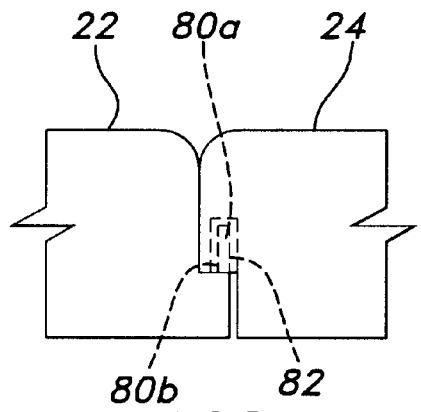
FIG. 6a is a front-end view of another embodiment of a component of the seat member of FIG. 1.

Referring to FIGS. 5–6a, an alternative embodiment for the fastening mechanisms 52 and 54 is shown. Accordingly, fastening mechanisms 52 and 54 are formed as elongate channel members 80 and 82. First and second outer seat members 20 and 24 include an elongate channel member 80 on the inward facing surface 31. The elongate channel member 80 is oriented so that the channel bottom 80a is located adjacent to the top surface 30 of the outer seat member 20. The elongate channel member 80 also includes closed ends 80b to be described below.

Inner seat member 22 includes elongate channel members 82 on the first and second sides 40 and 42, respectively. The elongate channel members 82 are oriented so that the channel bottom 82a is located adjacent to the bottom surface 38 of the inner seat member 22. As described above for teeth members 56 and 58, it is important to orient the elongate channel members 80 and 82 so that the first and second outer seat members 20 and 24 are engaged with inner seat member 22 by pushing the outer seat members 20 and 24 down onto the inner seat member 22. The downward force applied by a passenger to the outer seat members 20 and 24, furthers the interlocking function of elongate channel members 80 and 82. Conversely, if the fastening mechanisms 52 and 54 were oppositely configured to the orientation described above for the teeth 56 and 58 and elongate channel members 80 and 82, the downward torque force applied by the passenger's weight might tend to disengage the fastening mechanisms 52 and 54.

As shown in FIG. 6a, the elongate channel members 80 have closed ends 80b. The closed ends 80b prevent the inner seat member from translating by confining the elongate channel member 82 within the closed ends 80b of elongate channel member 80. The engagement of elongate channel members 80 and 82 prevents relative rotational translation of the inner and outer seat members 20–24 with respect to one another. The depth of the channels 80a and 82a of the elongate channel members 80 and 82 may be deeper or shallower according to preferred stability characteristics of the assembled seat cushion system 10. As described above, the elongate channel members 80 and 82 may be separate components or formed as part of the inner and outer seat members 20–24.

Figure 10:
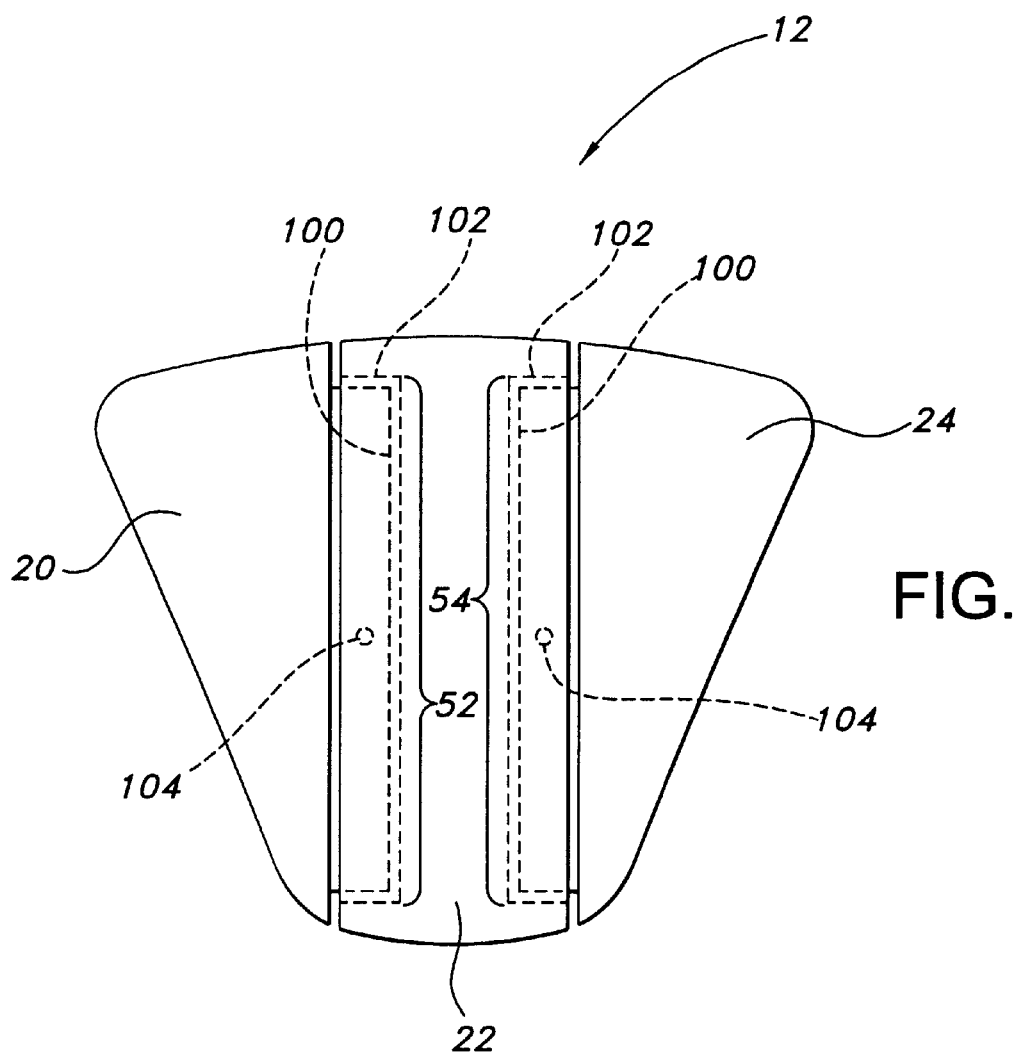
FIG. 10 is top view of yet another embodiment the seat member for use in a seat cushion system in accordance with the invention; and, FIG. 11 is a cross-sectional front end view of the embodiment of the seat member of FIG. 10.
Figure 11:
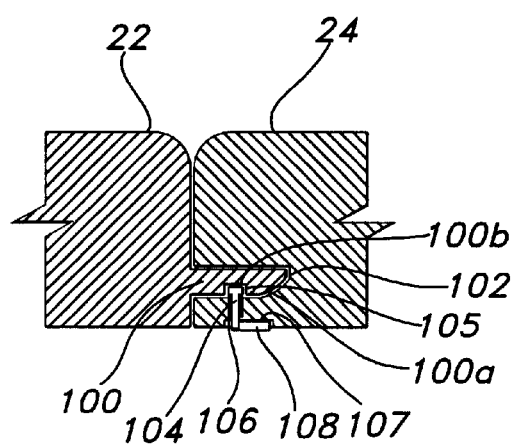

In yet another alternative embodiment of the invention, as best shown in FIGS. 10 and 11, fastening mechanisms 52 and 54 are formed as a ledge member 100 which is insertable into a recessed portion 102 of the inner seat member 22. Accordingly, each outer seat member 20 and 24 includes the ledge member 100 on its inward facing surface 31. It is preferred that the ledge member 100 and associated recessed portion 102, substantially encompass the full lengths of the seat members 20–24. Alternatively, however, the ledge member 100 may be divided into a plurality of finger elements also insertable into the recessed portion 102 of the inner seat member 22.

FIG. 11 shows a locking pin member 104 contained in a blind bore 105 of the inner seat member 22. The pin 104 is used to secure the ledge member 100 within the recessed portion 102 of inner seat member 22. The locking pin member 104 includes an actuator spring 106 and a grasping member 108. The grasping member 108 is rotatable and fits into a recess 107 of the inner seat member 22, so that the bottom of the seat member remains planar having no protrusions which might damage the motorcycle seat 14. The ledge member 100 includes a tapered front edge 100a, which actuates the pin member 104 when the ledge member 100 is inserted into the recessed portion 102. More specifically, as the ledge member 100 is inserted into the recessed portion 102, the tapered front edge 100a comes into contact with the pin member 104 which is actuated away from the ledge 100 as the pin 104 'rides up' the tapered edge 100a. An aperture 100b on the ledge member 100 is configured to receive the pin 104 when the ledge member 100 is seated in the recessed portion 102. The actuator spring 106 provides an impelling force which drives the pin into the aperture 100b once the pin 104 traverses the tapered edge 100a. Once the pin 104 is seated in the aperture 100b, the outer seat members 20 and 24 are fixedly secured to the inner seat member 22, providing a substantially unitary seat member 12. The seat members 20–24 are disengaged by grasping the grasping member 108 and pulling the pin member 104 away from the aperture 100b against the force of the actuator spring 106, allowing the outer seat members 20 and 24 to be separated from the inner seat member 22 for storage.

Referring to FIGS. 1 and 2, seat cushion system 10 includes at least two stop members 60. The stop members 60 according to the invention are substantially similar in function and appearance so only one member 60 will be described in detail. Stop member 60 is preferably located adjacent to the bottom surface 28 of inner and outer seat sections 20 and 24. Stop member 60 is adjustable along a track 62 defined along the bottom surface 28 of seat members 20 and 24. The track 62 may be incorporated as part of base 32 or may be an add-on component securable to the seat member 20. Stop members 60 preferably include an inwardly facing surface 64 configured for engaging a side of motorcycle seat 14 and an outwardly facing surface 66. A plurality of apertures 68 are defined along the track 62 for receiving similarly spaced and configured projections 70. Stop member 60 is adjustable along the length of track 62 by positioning the projections 70 as desired in the apertures 68 along the track 62.

The stop members 60 are adjustable enabling the seat cushion system 10 to 25 adapt to fit varying sized motorcycle seats 14. The stop members 60 also provide the important function of inhibiting relative movement of the seat member 12 with respect to the motorcycle seat 14. Once the seat member 12 is assembled from inner and outer seat members 20–24, the seat member 12 is centered and placed upon the motorcycle seat 14. The stop members 60 are adjusted towards the motorcycle seat until they are adjacent to the motorcycle seat 14 and preferably impinging on the seat 14. Once the stop members 60 are in position, they are snapped into place using the projections 70 and apertures 68 located in the track 62.

As shown in FIG. 1, stop members 60 may include a unitary two-prong structure or the stop member 60 may be two separate prongs adjustable along respective tracks 62. That is, seat cushion system 10 may include multiple track members 62 for accommodating multiple stop members 60. For example two track members 62 may be located on the bottom surface of the seat cushion system 10 for accommodating four independently adjustable stop members 60. Having four adjustable stop members 60 allows the seat cushion system 10 to adapt to irregularly contoured motorcycle seats or pillion pads 14.

Once the seat member 12 is in place and stop members 60 are adjusted as described, the seat cushion system 10 is ready to accommodate a passenger. The passenger's weight, once applied, furthers the action of stop members 60 by compressing the underlying motorcycle seat 14 which thereby expands outward and applies a resultant force to the inwardly facing surfaces 64 of the stop members 60.

Figure 7:
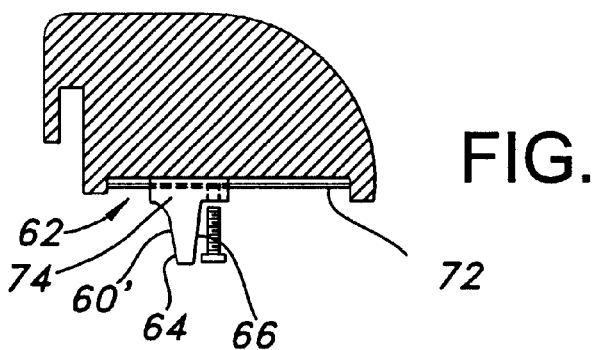
FIG. 7 is a cross-sectional front end view of another embodiment of a seat member component of the seat member of FIG. 1.

With reference to FIG. 7, there is shown an alternative embodiment of a stop member 60'. Stop member 60' is generally of the same geometry as the stop member 60, but is adjustable along a shaft 72 contained on the bottom surface 28 of seat members 20 and 24. Stop member 60' includes an aperture 74 running along its length for slidably receiving the shaft 72. Stop member 60' is adjustably positionable along the shaft 72 as by a screw 76 threadably receivable within a threaded aperture 78 running transversely with reference to aperture 74. Once stop member 60' is adjusted against seat 14, the screw 76 is threadably tightened against the shaft 72 to secure the stop member 60'. Once the seat member 12 is in place, the lower surfaces 28 and 38 further provide stability in conjunction with the motorcycle seat 14. When a passenger sits on the seat cushion system 10, the lower surfaces 28 and 38 provide a friction force which also tends to inhibit relative movement of the seat cushion system 10 with respect to the seat 14 in addition to the function of stop members 60.

Figure 8:
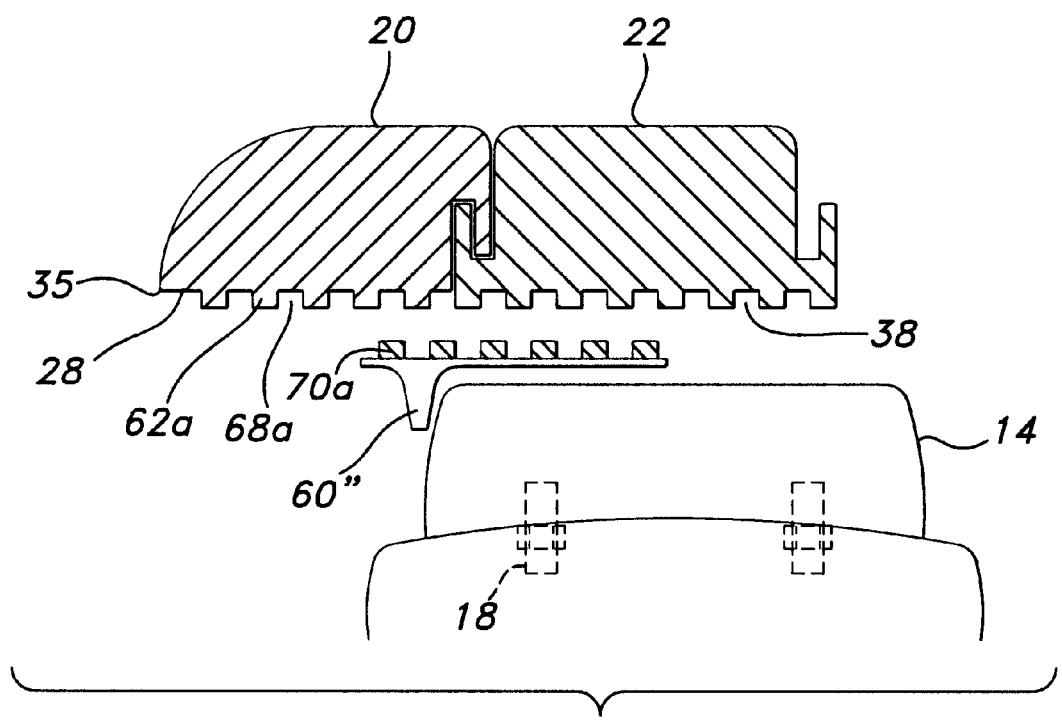
FIG. 8 is cross-sectional front end view of a another embodiment of a portion of a seat cushion system in accordance with the invention.

Referring to FIG. 8, another embodiment of stop member 60" is shown. Stop member 60" has a relatively long width, so that when the projections 70a are inserted into the apertures 68a of track 62a, preferably the stop member 60" will lie adjacent to the inner and outer seat members 20–24. Preferably, the track 62a will encompass the width of the seat member 12. An advantage of this alternative stop member 60" arrangement is that the motorcycle seat provides an upward force to the stop member 60" when the seat cushion system 10 is on the motorcycle seat 14. The stop member 60" acts as an added brace or fastener in addition to fastening mechanisms 52 and 54. Preferably, stop member 60" can be adjustably positioned to the peripheral edge 35 of seat members 20 and 24 while encompassing a portion of the inner seat member 22 with stop member 60".

Preferably, seat cushion system 10 is stored a motorcycle saddlebag or other container on the motorcycle when not being used. When a passenger desires a more comfortable seat member 12, the seat cushion system 10 is removed from the container and assembled into the seat cushion system 10, as described above. When the seat cushion system 10 is no longer needed, it is disassembled and stored in the container.

Alternatively the seat cushion system 10 may utilize a unitary seat member 26 as shown in FIG. 9. The unitary seat member 26 would operate similarly as described above for the separable seat cushion system 10.

Accordingly, the seat cushion system 10 provides comfort and relaxation to the riding passenger regardless of the size of the pillion pad or seat 14 fitted to the motorcycle. When the motorcycle is parked, removing the seat cushion system 10, slipping it apart, and storing it in a container immediately restores the motorcycle's clean aesthetics. The container may be a pouch made of simple fabric for storage in the motorcycle saddlebags (if available), or the container may be a "biker leather" look for attaching to the motorcycle and blending in as a typical acceptable accessory bag.

Having described various aspects and embodiments of the invention, and several advantages thereof, it will be recognized by those of ordinary skills that the invention is susceptible to various modifications, substitutions and revisions within the spirit and scope of the appended claims. For example, it may be preferable to secure the seat cushion system 10 to the motorcycle pillion seat 14 by straps, a bungee cord, hooks, or other similar fastening mechanisms. The seat cushion system 10 may preferably be a unitary seat member that is collapsible. For example, the seat cushion system 10 may include a base member that is foldable or compactible without separating the seat system. The base member of the seat cushion system 10 may include a hinging mechanism allowing the seat cushion system 10 to "fold-in" on itself, thereby compacting for storage. Finally, the seat members 20–24 may have a longitudinal orientation instead of the lateral orientation as described above. Accordingly, it is expressly intended that the foregoing description and the accompanying drawings are illustrative of preferred embodiments only, not limiting thereto, and that the true spirit and scope of the present invention be determined by reference to the appended claims.

What is claimed is:

1. An auxiliary passenger seat cushion having a width for providing ridability and comfort to a passenger of a motorcycle adaptable to fit adjacent to a motorcycle seat of a motorcycle, the motorcycle seat having a width defined by opposite sides thereof, the auxiliary passenger seat cushion comprising:

separable seat sections for breakdown and storage of the passenger seat cushion, wherein the separable seat sections each include a base member having a bottom surface for engaging the motorcycle seat and providing stability to the auxiliary passenger seat cushion, and a top surface for engaging a passenger providing comfort and ridability to the passenger, a fastener having engagement surfaces disposed on the separable seat section for engaging together and for fixedly securing the separable sections together to provide a composite seat member, and stop members extending from at least one of the separable seat sections for engaging the motorcycle seat by urging against the opposite sides of the motorcycle seat thereby restricting relative motion between the composite seat member and motorcycle seat.

2. The auxiliary passenger seat cushion of claim 1, wherein the auxiliary passenger seat cushion has a length of between about 9 inches and about 12 inches, a height of between about 1 inch and about 4 inches, and the width is between about 9 inches and about 16 inches.

3. The auxiliary passenger seat cushion of claim 1, wherein the separable sections consist of at least two separate sections separable for easy storage within an auxiliary storage compartment or saddlebag.

4. The auxiliary passenger seat cushion of claim 1, further comprising a snap-fit strap adjacently affixed to the auxiliary passenger seat cushion for attaching to the motorcycle seat further restricting translational and rotational movement of the auxiliary passenger seat cushion relative to the motorcycle seat.

5. The auxiliary passenger seat cushion of claim 1, wherein the engagement surfaces of the fastener form a plurality of interlocking male and female counterparts.

6. The auxiliary passenger seat cushion of claim 1, wherein the separable seat sections include a middle seat member having a first side, a second side, a bottom surface, and a top surface, a first outer seat member having a first side, a second side, a bottom surface, and a top surface, and a second outer seat member having a first side, a second side, a top surface, and a bottom surface, the bottom surfaces of each seat member for engaging the motorcycle seat providing stability to the auxiliary passenger seat cushion, the top surfaces of each seat member for engaging a passenger providing comfort and ridability, wherein the fastener separably affixes the first side of the middle seat member to the second side of the first outer seat member and separably affixes the second side of the middle seat member to the first side of the second outer seat member, wherein the stop members are adjacently located to the bottom surface of at least one of the separable seat sections selectively variable along the width of the auxiliary passenger seat cushion.

7. The auxiliary passenger seat cushion of claim 1, wherein the separable sections are inflatable to provide varying degrees of stiffness and ridability to the passenger.

8. An auxiliary passenger seat cushion having a width for providing ridability and comfort to a passenger of a motorcycle adaptable to fit adjacent to a motorcycle seat of a motorcycle, the motorcycle seat having a width defined by opposite sides thereof, the auxiliary passenger seat cushion comprising:

separable seat sections for breakdown and storage of the passenger seat cushion, a fastener having engagement surfaces disposed on the separable seat section for engaging together and for fixedly securing the separable sections together to provide a composite seat member, wherein the engagement surfaces of the fastener comprise interlocking teeth, the interlocking teeth having a wide base member tapering to a distal end for snap fitting the separable seat sections together to form the composite auxiliary passenger seat cushion, and stop members extending from at least one of the separable seat sections for engaging the motorcycle seat by urging against the opposite sides of the motorcycle seat thereby restricting relative motion between the composite seat member and motorcycle seat.

9. An auxiliary passenger seat cushion having a width for providing ridability and comfort to a passenger of a motorcycle adaptable to fit adjacent to a motorcycle seat of a motorcycle, the motorcycle seat having a width defined by opposite sides thereof, the auxiliary passenger seat cushion comprising:

separable seat sections for breakdown and storage of the passenger seat cushion, a fastener having engagement surfaces disposed on the separable seat section for engaging together and for fixedly securing the separable sections together to provide a composite seat member, wherein the engagement surfaces of the fastener form elongate channels having closed ends, wherein the channels are formed to interlock, the closed ends preventing lateral and rotational displacement of the separable seat sections when the motorcycle is accelerated, and stop members extending from at least one of the separable seat sections for engaging the motorcycle seat by urging against the opposite sides of the motorcycle seat thereby restricting relative motion between the composite seat member and motorcycle seat.

10. An auxiliary passenger seat cushion having a width for providing ridability and comfort to a passenger of a motorcycle adaptable to fit adjacent to a motorcycle seat of a motorcycle, the motorcycle seat having a width defined by opposite sides thereof, the auxiliary passenger seat cushion comprising:

separable seat sections for breakdown and storage of the passenger seat cushion, a fastener having engagement surfaces disposed on the separable seat section for engaging together and for fixedly securing the separable sections together to provide a composite seat member, wherein the engagement surfaces of the fastener comprise ledge members and corresponding recesses for accepting the ledge members, a pin actuator secures the ledge members within the recesses, and stop members extending from at least one of the separable seat sections for engaging the motorcycle seat by urging against the opposite sides of the motorcycle seat thereby restricting relative motion between the composite seat member and motorcycle seat.

11. An auxiliary passenger seat cushion having a width for providing ridability and comfort to a passenger of a motorcycle adaptable to fit adjacent to a motorcycle seat of a motorcycle, the motorcycle seat having a width defined by opposite sides thereof, the auxiliary passenger seat cushion comprising:

separable seat sections for breakdown and storage of the passenger seat cushion, a fastener having engagement surfaces disposed on the separable seat section for engaging together and for fixedly securing the separable sections together to provide a composite seat member, and stop members extending from at least one of the separable seat sections for engaging the motorcycle seat by urging against the opposite sides of the motorcycle seat thereby restricting relative motion between the composite seat member and motorcycle seat, wherein the stop members are adjustably positionable along a bottom surface of the auxiliary passenger seat for detachably engaging the auxiliary passenger seat cushion to a motorcycle seat, thereby securing the auxiliary passenger seat cushion to motorcycle seats of differing dimensionalities.

12. The auxiliary passenger seat cushion of claim 11, wherein the separable seat sections each include a base member having a bottom surface for engaging the motorcycle seat and providing stability to the auxiliary passenger seat cushion, and a top surface for engaging a passenger providing comfort and ridability to the passenger by having the width greater than the width of the motorcycle seat thereby providing a larger volume of padding to the passenger, the bottom surface of each base member including a plurality of adjustment elements for accepting the stop members, the adjustment elements located to provide varying dimensional adjustment of the stop members allowing the passenger seat to adapt to motorcycle seats of varying dimensionality.

13. The auxiliary passenger seat cushion of claim 11, wherein the separable seat sections further include:

a middle seat member having a first side forming an elongate channel member having a base, a length, and a depth, a second side forming an elongate channel member having a base, a length, and a depth, a bottom surface, and a top surface, the base of each elongate channel located adjacent to the bottom surface of the middle seat member, a first outer seat member having a first side, a second side forming an elongate channel member having a base, a length, a depth and closed ends, a bottom surface, and a top surface, the base of the elongate channel located adjacent to the top surface, and a second outer seat member having a first side forming an elongate channel member having a base, a length, a depth and closed ends, a second side, a top surface, and a bottom surface, the base of the elongate channel located adjacent to the top surface, wherein the elongate channel members engagable and detachable, wherein the lengths of elongate channel members of the first and second outer seat members are greater than the lengths of the elongate channel members of the middle seat member for confining the lengths of the elongate channels of the middle seat member within the closed ends of the elongate channel members of the first and second outer seat members thereby preventing translational and rotational movement of the separable seat sections when engaged, the bottom surfaces of each seat member for engaging the motorcycle seat providing stability to the auxiliary passenger seat cushion, the top surfaces of each seat member for engaging a passenger providing comfort and ridability, wherein the stop members are adjacently located to the bottom surface of at least one of the separable seat sections selectively variable along the width of the auxiliary passenger seat cushion.

14. The auxiliary passenger seat cushion of claim 11, wherein the separable seat sections further include:

a middle seat member having a first side forming teeth, each tooth having a base and a distal end, the teeth having gaps therebetween, a second side forming teeth, each tooth having a base and a distal end having gaps therebetween, a bottom surface, and a top surface, wherein the base of each tooth is located adjacent to the bottom surface, a first outer seat member having a first side, a second side forming teeth, each tooth having a base and a distal end, the teeth having gaps therebetween, a second side forming teeth, each tooth having a base and a distal end having gaps therebetween, a bottom surface, and a top surface, wherein the base of each tooth is located adjacent to the bottom surface, and a second outer seat member having a first side forming teeth, each tooth having a base and a distal end, the teeth having gaps therebetween, a second side, a top surface, and a bottom surface, wherein the base of each tooth is located adjacent to the bottom surface, the teeth of the middle seat member and outer seat members engagable and detachable, wherein the teeth are formed as complimentary sets wherein each tooth tapers from the base to the distal end thereby preventing translational and rotational movement of the separable seat sections when the teeth are engaged, the bottom surfaces of each seat member for engaging the motorcycle seat providing stability to the auxiliary passenger seat cushion, the top surfaces of each seat member for engaging a passenger providing comfort and ridability, wherein the stop members are adjacently located to the bottom surface of at least one of the separable seat sections selectively variable along the width of the auxiliary passenger seat cushion.

15. The auxiliary passenger seat of claim 11, wherein the separable seat sections include a middle seat member having a first side, a second side, a bottom surface, and a top surface, a first outer seat member having a first side, a second side, a bottom surface, and a top surface, and a second outer seat member having a first side, a second side, a top surface, and a bottom surface, the bottom surfaces of each seat member for engaging the motorcycle seat providing stability to the auxiliary passenger seat cushion, the top surfaces of each seat member for engaging a passenger providing comfort and ridability, wherein the fastener separably affixes the first side of the middle seat member to the second side of the first outer seat member and separably affixes the second side of the middle seat member to the first side of the second outer seat member, wherein the stop members are adjacently located to the bottom surface of at least one of the separable seat sections selectively variable along the width of the auxiliary passenger seat cushion, wherein the bottom surface of each outer lateral section includes a plurality of adjustment members for accepting the adjustable stop members for accommodating and fastening the auxiliary passenger seat to varying dimensional motorcycle seats.

16. An auxiliary passenger seat cushion having a width for providing ridability and comfort to a passenger of a motorcycle adaptable to fit adjacent to a motorcycle seat of a motorcycle, the motorcycle seat having a width defined by opposite sides thereof, the auxiliary passenger seat cushion comprising:

separable seat sections for breakdown and storage of the passenger seat cushion, wherein the separable seat sections include three separable seat members, two outer lateral members and one inner lateral member, each member having a rear portion, a front portion, a top surface for engaging a passenger, and a substantially planar bottom surface for engaging the motorcycle seat, wherein the rear portion of each member is slightly higher than the front portion for preventing a passenger from sliding off of the passenger seat when the motorcycle is accelerated, and wherein the top surfaces gradually slope in a concave manner from the rear portion to the front portion, the outer lateral members having a substantially planar inwardly facing surface and a outer peripheral edge, the lateral inner member having two substantially planar outwardly facing side surfaces, wherein the top surface of each outer lateral member gradually slope away from the inwardly facing surface to the outer peripheral edge, a fastener having engagement surfaces disposed on the separable seat section for engaging together and for fixedly securing the separable sections together to provide a composite seat member, and stop members extending from at least one of the separable seat sections for engaging the motorcycle seat by urging against the opposite sides of the motorcycle seat thereby restricting relative motion between the composite seat member and motorcycle seat.

* * * * *